(12) United States Patent
Dudar (10) Patent No.: US 11,840,991 B2
(45) Date of Patent: Dec. 12, 2023

(54) METHOD AND SYSTEM FOR ADJUSTING PRESSURE IN A FUEL TANK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/304,897

(22) Filed: Jun. 28, 2021

(65) Prior Publication Data

US 2022/0412292 A1    Dec. 29, 2022

(51) Int. Cl.
*F02M 25/08* (2006.01)
*B01D 53/04* (2006.01)

(52) U.S. Cl.
CPC ..... *F02M 25/0836* (2013.01); *B01D 53/0446* (2013.01); *F02M 25/0854* (2013.01); *F02M 25/0872* (2013.01); *B01D 2253/102* (2013.01); *B01D 2257/702* (2013.01); *B01D 2259/40086* (2013.01); *B01D 2259/4516* (2013.01)

(58) Field of Classification Search
CPC ........... F02M 25/0836; F02M 25/0854; F02M 25/0872; B01D 53/0446; B01D 2253/102; B01D 2257/702; B01D 2259/40086; B01D 2259/4516
See application file for complete search history.

(56) References Cited

U.S. PATENT DOCUMENTS

| | | |
|---|---|---|
| 5,806,500 A | 9/1998 | Fargo et al. |
| 8,776,585 B2 | 7/2014 | Pursifull et al. |
| 9,574,507 B2 | 2/2017 | Pursifull |
| 9,732,685 B2 * | 8/2017 | Dudar .................. F02M 25/08 |
| 9,797,809 B2 | 10/2017 | Dudar et al. |
| 10,774,761 B2 | 9/2020 | Dudar et al. |
| 10,830,189 B1 * | 11/2020 | Dudar ................ F02M 25/0836 |
| 10,968,846 B2 | 4/2021 | Dudar |
| 2012/0204720 A1 | 8/2012 | Tschantz et al. |
| 2014/0026865 A1 * | 1/2014 | Dudar ................ F02M 25/0818 |
| | | 123/518 |
| 2018/0245545 A1 * | 8/2018 | Benjey ................ F02D 41/0032 |
| 2019/0128218 A1 * | 5/2019 | Kawanishi ................ F04F 5/20 |
| 2019/0234294 A1 * | 8/2019 | Sager ................ F02M 25/0836 |
| 2020/0149482 A1 | 5/2020 | Dudar |
| 2020/0369508 A1 * | 11/2020 | Dudar .............. B60K 15/03504 |

* cited by examiner

*Primary Examiner* — Xiao En Mo
(74) *Attorney, Agent, or Firm* — Vincent Mastrogiacomo; McCoy Russell LLP (57) ABSTRACT

Methods and systems for purging fuel vapors from an evaporative emissions system of a vehicle are described. The methods and systems may include opening one or more bypass valves of carbon filled canisters to supply air to a low pressure port of a venturi pump. The bypass valves may be opened when fuel vapors are being moved from a fuel tank to an engine while the engine operates.

18 Claims, 6 Drawing Sheets

FIG. 6

METHOD AND SYSTEM FOR ADJUSTING PRESSURE IN A FUEL TANK

FIELD

The present description relates generally to methods and systems for controlling pressure and vacuum in a fuel tank.

BACKGROUND/SUMMARY

A vehicle may include an evaporative emissions control system that includes a plurality of carbon filled canisters to store fuel vapors. The carbon filled canisters may be connected in series reduce release of fuel vapors from the vehicle into the atmosphere. The carbon filled canisters may store fuel vapors that are generated when a vehicle's engine is running and the carbon filled canisters may be purged of fuel vapors. The vehicle's fuel tank may also store fuel vapors when the vehicle's engine is not running, but the vehicle's fuel tank has a limited capacity to store fuel vapors because the fuel vapors may increase pressure within the fuel tank. It may be desirable to depressurize the fuel tank before the fuel tank is filled so that pressure in the fuel tank does not prematurely shut-off the fuel filler valve when the fuel tank is being filled. However, the fuel tank may not be depressurized in a short period of time because the series connected carbon filled canisters may limit flow of fuel vapors from the fuel tank. Likewise, the series connected carbon filled canisters may limit air flow into the fuel tank when vacuum generated during diurnal cooling in the fuel tank is being released. Consequently, it may be desirable to provide ways of improving fuel tank depressurization when an evaporative emissions system includes a plurality of carbon filled canisters.

The inventors herein have recognized the above-mentioned issue and have developed a method for operating an evaporative emissions system of a vehicle, comprising: reducing pressure in a fuel tank via opening a fuel tank isolation valve and opening a bypass valve of a first carbon filled canister.

By opening the fuel tank isolation valve and the bypass valve of the first carbon filled canister, it may be possible to provide the technical result of depressurizing a fuel tank in a shorter period of time. Depressurizing the fuel tank in a shorter period of time may be desirable because an engine that consumes the fuel vapors may have fewer opportunities to run and consume the fuel vapors when the engine is included in a hybrid vehicle. In addition, a venturi pump and bypass valves may allow vacuum to be quickly removed from a fuel tank by allowing air to flow around fuel vapor canisters that are not storing fuel vapors so that air may enter the fuel tank at a faster rate. Further, the venturi pump may reduce a possibility of disturbing engine combustion stability by providing a mixture of air and fuel to the engine instead of simply delivering a slug of fuel to the engine when the fuel tank is being purged of fuel vapors.

The present description may provide several advantages. In particular, the approach may reduce pressurization and depressurization times for a fuel vapor storage system that includes a fuel tank. Additionally, the approach may reduce a possibility of engine combustion stability degradation. Further, the approach may be beneficial for hybrid vehicles where shorter evaporative emissions system purging times may be desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
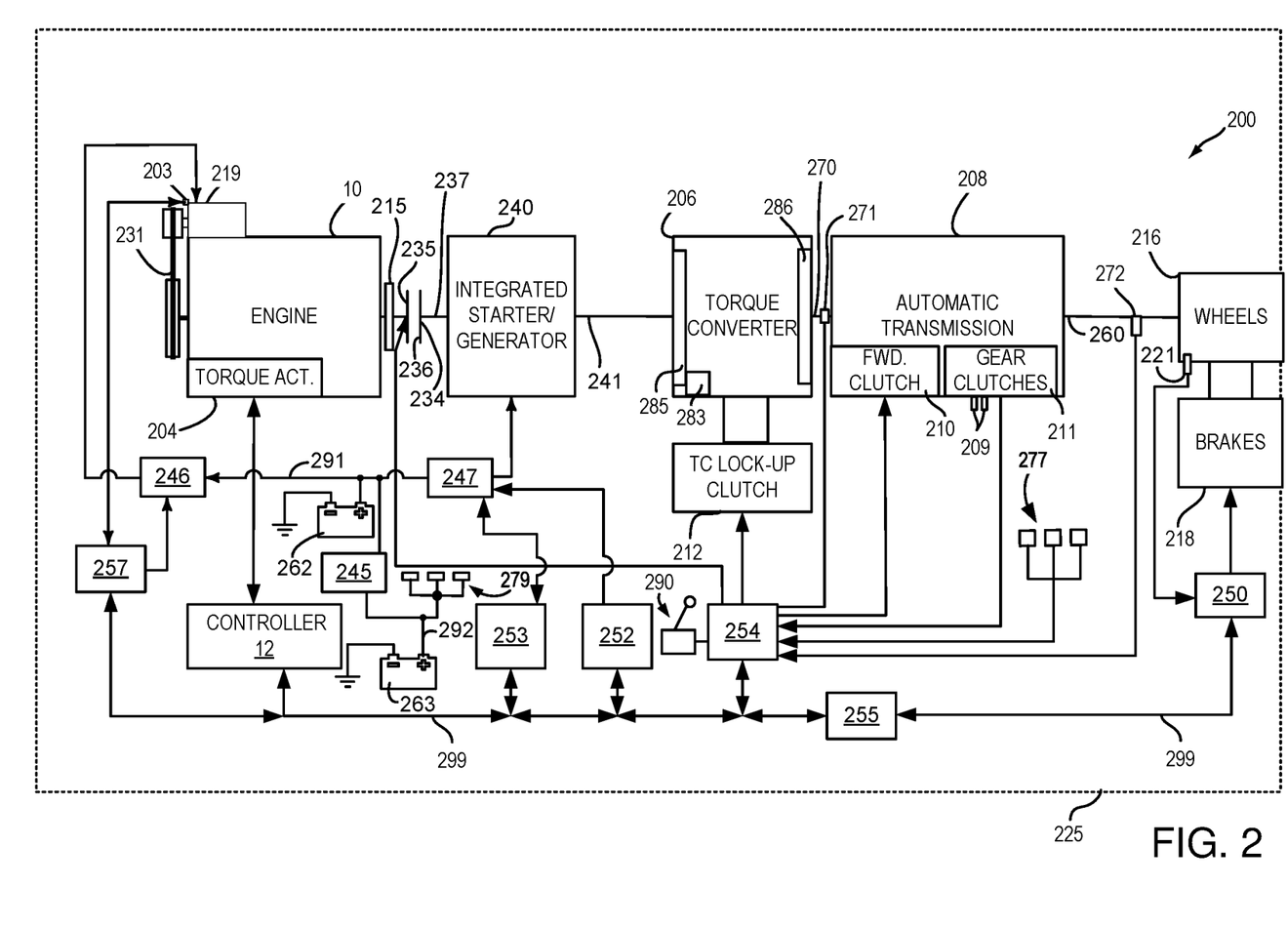
FIG. 2 shows an example powertrain of the vehicle that includes the engine.
Figure 3:
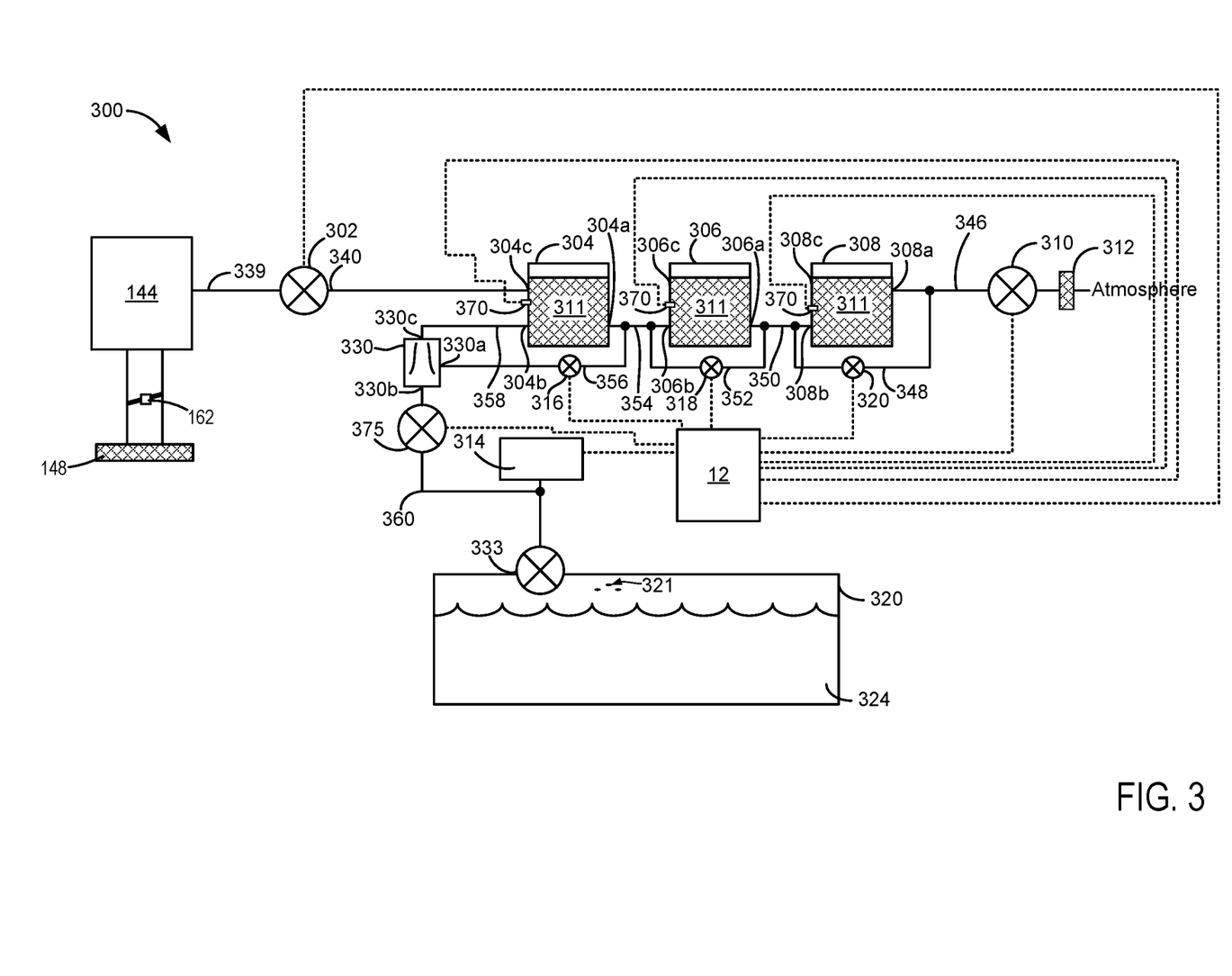
FIG. 3 shows a block diagram of an example evaporative emissions system for the vehicle.
Figure 4:
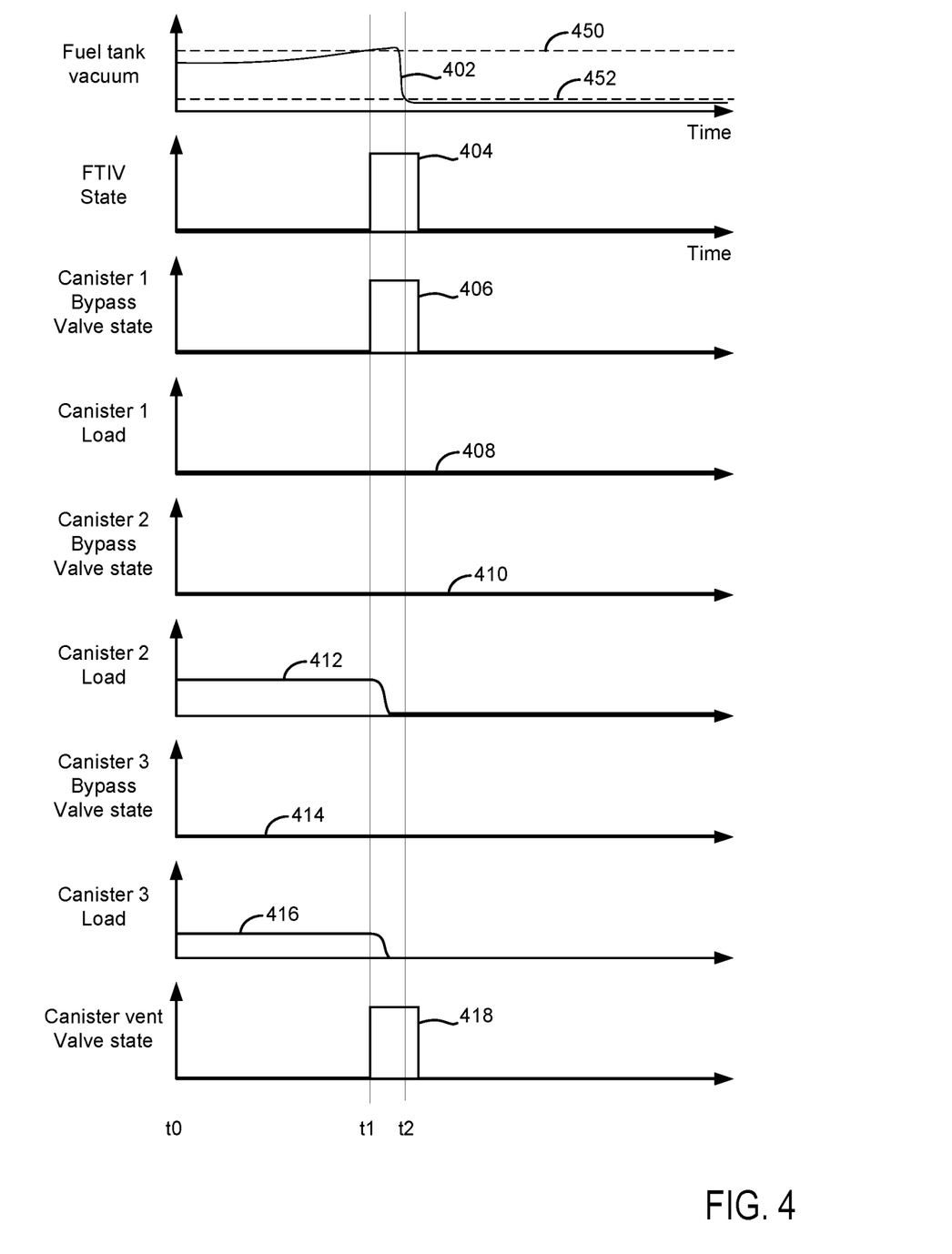
FIGS. 4 and 5 show example evaporative emissions system pressurization and depressurization sequences according to the method of FIG. 6.
Figure 5:
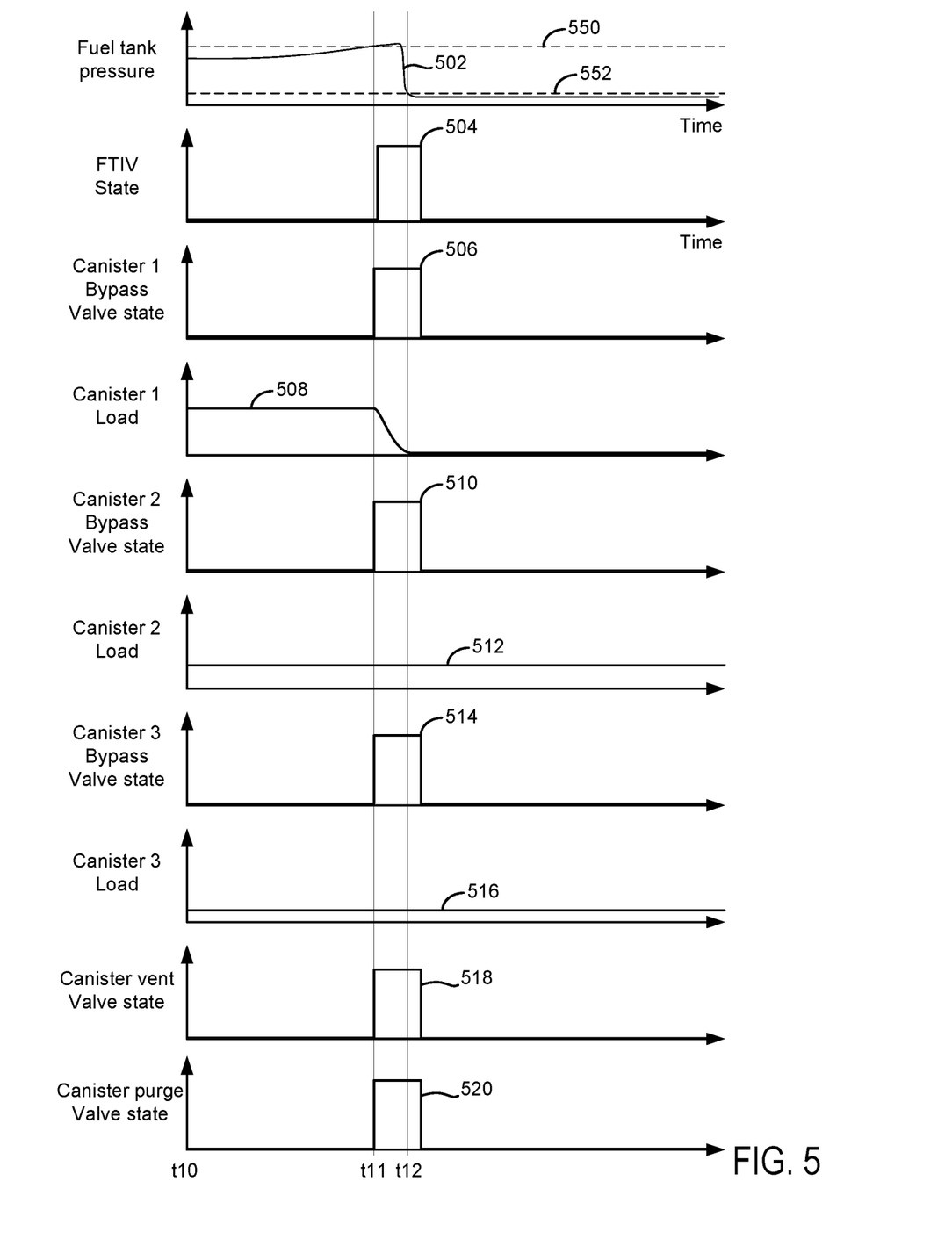

The following description relates to systems and methods for controlling pressure in a fuel vapor storage system that includes a fuel tank. In one example, the fuel vapor storing system includes a plurality of carbon filled canisters for storing fuel vapors. The carbon filled canisters may be bypassed to increase a rate that air flows into a fuel tank when the fuel tank holds a vacuum. The carbon filled canisters may also be bypassed when pressure is released from the fuel tank so that air may mix with fuel vapors that leave the fuel tank so as to improve engine combustion stability when the fuel tank is purged of fuel vapors. The fuel vapors may be associated with an engine of the type shown in FIG. 1. The engine may be part of a driveline or powertrain as shown in FIG. 2. The engine and powertrain may include an evaporative emissions system as shown in FIG. 3. The evaporative emissions system may be pressurized or depressurized as shown in the sequences of FIGS. 4 and 5. The evaporative emissions system may be operated according to the method of FIG. 6.

Figure 1:
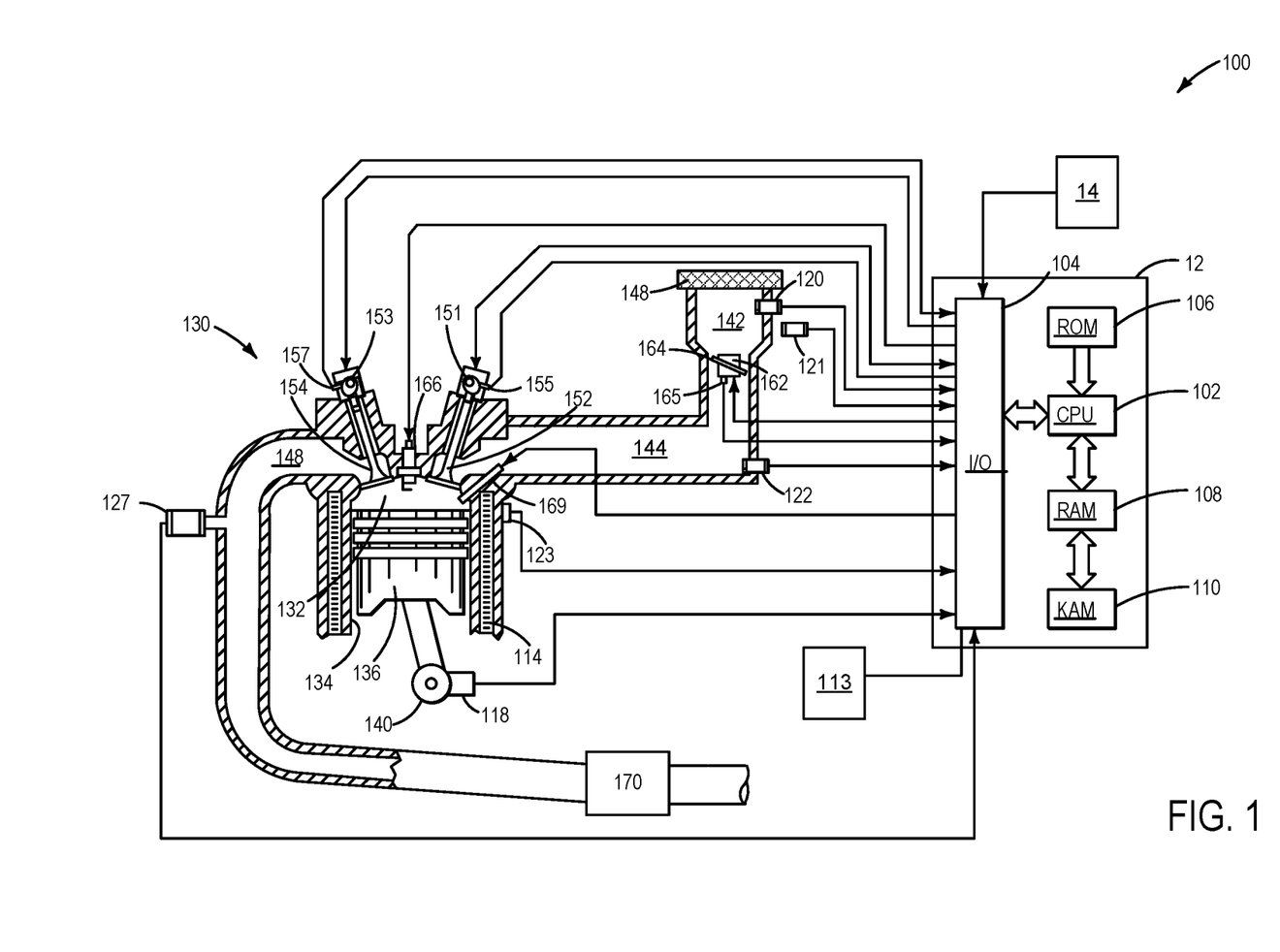
FIG. 1 shows an example internal combustion engine of a vehicle.

Referring now to FIG. 1, a schematic diagram showing one cylinder of a multi-cylinder engine 130 in an engine system 100 is shown. Engine 130 may be controlled at least partially by a control system including a controller 12 and by input from an autonomous driver or controller 14. Alternatively, a vehicle operator (not shown) may provide input via an input device, such as an engine torque, power, or air amount input pedal (not shown).

A combustion chamber 132 of the engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake passage 142 includes an intake air filter 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to activate, deactivate (e.g., hold in a closed position for an engine cycle of two revolutions), and vary timing of valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include an intake throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130. Barometric pressure may be determined via sensor 121.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

The controller 12 is shown in FIG. 1 as a microcomputer, including a microprocessor unit 102, input/output ports 104, an electronic storage medium for executable programs and calibration values shown as read only memory chip 306 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a Hall effect sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 (e.g., non-transitory memory) can be programmed with computer readable data representing non-transitory instructions executable by the processor 102 for performing at least portions of the methods described below as well as other variants that are anticipated but not specifically listed. CPU 102 may sample output of one or more sensors via A/D converters within I/O 104 and store the voltage/pressures/etc. to RAM memory. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, a block diagram of an example evaporative emissions system 300 is shown. Evaporative emissions system 300 includes a canister purge valve (CPV) 302, a first carbon filled canister 304, a second carbon filled canister 306, a third carbon filled canister 308, a canister vent valve (CVV) 310, a dust box 312, a fuel tank isolation valve (FTIV) 375, and a fuel tank 320. Carbon filled canisters 304-308 may include activated carbon 311 to store fuel vapors. The system of FIG. 3 shows three carbon filled canisters, but the principals and methods described herein may be applied to evaporative emissions systems with two carbon filled canisters or more than three carbon filled canisters. Three existing smaller volume carbon filled canisters may be less expensive than one larger carbon filled canister that has the same volume as the three smaller volume carbon filled canisters.

Canister purge valve 302 may selectively provide fluidic communication between first carbon filled canister 304 and intake manifold 144. Controller 12 may adjust operating states of each valve shown in FIG. 3. Controller 12 may also receive output from fuel tank pressure sensor 314. Canister purge valve 302 and canister vent valve 310 may be opened when fuel vapors are stored in at least one of first, second, and third carbon filled canisters 304-308. Air may be draw from atmosphere via engine vacuum from within intake manifold 144 when canister purge valve 302 and canister vent valve 310 are open. Each of carbon filled canisters 304-308 include a vent port (e.g., 304a, 306a, and 308a), a load port 371 (e.g., 304b, 306b, and 308b), and a purge port (e.g. 304c, 306c, and 308c). The purge ports 306c and 308c are plugged.

Evaporative emissions system 300 also includes a venturi pump 330 that includes a low pressure port 330a, a first motive fluid port 330b, and a second motive fluid port 330c. Fuel vapors may flow from fuel tank 320 to venturi pump 330 when canister purge valve 302 and fuel tank isolation valve 375 are open. Fuel vapors may flow through first and second motive fluid ports 330b and 330c of venturi pump 330, which may draw air and/or fuel vapors into venturi pump 330 by way of low pressure port 330a and first bypass passage 356 when first bypass valve 316 is open. Air and/or fuel vapor may flow from venturi pump 330 to first carbon filled canister 304. Air and/or fuel vapor may flow from first carbon filled canister 304 to engine intake manifold 144 when engine intake manifold pressure is low and canister purge valve 302 is open.

Fuel tank 320 is shown with a fuel fill limit vent valve (FLVV) 333. FLVV may close to prevent fuel flow into conduit 360 when fuel tank 320 is full of fuel 324. When fuel tank 320 is being filled and FLVV closes, pressure may build in fuel tank 320 such that the fuel filler nozzle stops flow of fuel into fuel tank 320. Fuel tank 320 may also hold fuel vapor 321.

Conduit 339 couples intake manifold 144 to canister purge valve 302 allowing fluidic communication between the two devices. Conduit 340 couples canister purge valve 302 and first carbon filled canister 304. Conduit 346 couples third carbon filled canister 308 and canister vent valve 310. Conduit 358 couples second motive fluid port 330c of venturi pump 330 to load port 304b of first carbon filled canister 304. Conduit 354 couples first carbon filled canister 304 and second carbon filled canister 306. Conduit 350 couples third carbon filled canister 308 and second carbon filled canister 306.

First carbon filled canister 304 includes a bypass passage or conduit 356 and a bypass valve 316 for selectively allowing and preventing air flow through conduit 356. Similarly, second carbon filled canister 306 includes a bypass passage or conduit 352 and a bypass valve 318 for selectively allowing and preventing air flow through conduit 352. Likewise, third carbon filled canister 308 includes a bypass passage or conduit 348 and a bypass valve 320 for selectively allowing and preventing air flow through conduit 348. Thus, conduits 348, 352, and 356 may allow air to flow around carbon filled canisters 304, 306, and 308. For example, if bypass valve 320 is open, air may be drawn from atmosphere and through passage 348 without passing through carbon filled canister 308 so that it may eventually be drawn into intake manifold 144. The air flow may follow the path of least resistance, which may be through a bypass passage if the bypass passage's bypass valve is open.

Loading of first carbon filled canister 304, second carbon filled canister 306, and third carbon filled canister 308 may be determined via temperature sensors 370, which are mounted therein. In particular, a change in temperature within the carbon filled canisters may indicate a mass of hydrocarbons stored within the carbon filled canisters.

Thus, the system of FIGS. 1-3 provides for a vehicle system, comprising: an engine; at least two fuel vapor storage canisters fluidically coupled in series; a first conduit coupling a canister purge valve to a first of the at least two fuel vapor storage canisters; a first bypass passage coupling a vent port of a first of the at least two fuel vapor storage canisters to a low pressure port of a venturi pump; and a second conduit coupling a first motive fluid port of the venturi pump and a load port of the first of the at least two fuel vapor storage canisters. The vehicle system further comprises a second bypass passage for a second of the at least two fuel vapor storage canisters and a third bypass passage for a third of the at least two fuel vapor storage canisters. The vehicle system further comprises a first bypass valve positioned along the first bypass passage, a second bypass valve positioned along the second bypass passage, and a third bypass valve positioned along the third bypass passage. The vehicle system further comprises a canister vent valve coupled to the third of the at least two fuel vapor storage canisters via a third conduit. The vehicle system further comprises a fuel tank isolation valve coupled to a second motive fluid port of the venturi pump via a fourth conduit. The vehicle system further comprises a fifth conduit coupling the fuel tank isolation valve and a fill limit vent valve. The vehicle system further comprises a canister purge valve and a controller including executable instructions stored in non-transitory memory that cause the controller to open the canister purge valve and the fuel tank isolation valve to activate the venturi pump.

Referring now to FIG. 4, an example sequence for reducing a level of vacuum in a fuel tank is shown. The sequence of FIG. 4 may be provided by the system of FIGS. 1-3 in cooperation with the method of FIG. 6. Vertical markers at times t0-t2 represent times of interest during the sequence. All of the plots occur at a same time.

The first plot from the top of FIG. 4 is a plot of an amount of vacuum in a fuel tank versus time. The vertical axis represents the vacuum level and the magnitude of the vacuum level increases in the direction of the vertical axis arrow. The horizontal axis represents time and time increases in the direction of the horizontal axis arrow. Trace 402 represents the level of vacuum in the fuel tank.

The second plot from the top of FIG. 4 is a plot of the state of the fuel tank isolation valve (FTIV) versus time. The vertical axis represents the operating state of the FTIV and the FTIV is fully open when trace 404 is at a higher level near the vertical axis arrow. The FTIV is fully closed when trace 404 is near the level of the horizontal axis. Trace 404 represents the state of the FTIV. The horizontal axis represents time and time increases in the direction of the horizontal axis arrow.

The third plot from the top of FIG. 4 is a plot of the state of the bypass valve for the first carbon filled canister (e.g., the first bypass valve state) versus time. The vertical axis represents the operating state of the bypass valve for the first carbon filled canister (e.g., 304) and the bypass valve for the first carbon filled canister is fully open when trace 406 is at a higher level near the vertical axis arrow. The horizontal axis represents time and time increases in the direction of the horizontal axis arrow. The bypass valve for the first carbon filled canister is fully closed when trace 406 is near the level of the horizontal axis. Trace 406 represents the state of the bypass valve for the first carbon filled canister.

The fourth plot from the top of FIG. 4 is a plot of the hydrocarbon load (e.g., amount of hydrocarbons stored in the carbon filled canister) of the first carbon filled canister versus time. The vertical axis represents the hydrocarbon load of the first carbon filled canister and the hydrocarbon load increases in the direction of the vertical axis arrow. The horizontal axis represents time and time increases in the direction of the horizontal axis arrow. Trace 408 represents the load of the first carbon filled canister.

The fifth plot from the top of FIG. 4 is a plot of the state of the bypass valve for the second carbon filled canister (e.g., the second bypass valve state) versus time. The vertical axis represents the operating state of the bypass valve for the second carbon filled canister (e.g., 306) and the bypass valve for the second carbon filled canister is fully open when trace 410 is at a higher level near the vertical axis arrow. The bypass valve for the second carbon filled canister is fully closed when trace 410 is near the level of the horizontal axis. The horizontal axis represents time and time increases in the direction of the horizontal axis arrow. Trace 410 represents the state of the bypass valve for the second carbon filled canister.

The sixth plot from the top of FIG. 4 is a plot of the hydrocarbon load (e.g., amount of hydrocarbons stored in the carbon filled canister) of the second carbon filled canister versus time. The vertical axis represents the hydrocarbon load of the second carbon filled canister and the hydrocarbon load increases in the direction of the vertical axis arrow. The horizontal axis represents time and time increases in the direction of the horizontal axis arrow. Trace 412 represents the load of the second carbon filled canister.

The seventh plot from the top of FIG. 4 is a plot of the state of the bypass valve for the third carbon filled canister (e.g., the third bypass valve state) versus time. The vertical axis represents the operating state of the bypass valve for the third carbon filled canister (e.g., 308) and the bypass valve for the third carbon filled canister is fully open when trace 414 is at a higher level near the vertical axis arrow. The bypass valve for the third carbon filled canister is fully closed when trace 414 is near the level of the horizontal axis. The horizontal axis represents time and time increases in the direction of the horizontal axis arrow. Trace 414 represents the state of the bypass valve for the third carbon filled canister.

The eighth plot from the top of FIG. 4 is a plot of the hydrocarbon load (e.g., amount of hydrocarbons stored in the carbon filled canister) of the third carbon filled canister versus time. The vertical axis represents the hydrocarbon load of the third carbon filled canister and the hydrocarbon load increases in the direction of the vertical axis arrow. The horizontal axis represents time and time increases in the direction of the horizontal axis arrow. Trace 416 represents the load of the third carbon filled canister.

The ninth plot from the top of FIG. 4 is a plot of the state of the canister vent valve 310 versus time. The vertical axis represents the operating state of the canister vent valve and the canister vent valve is fully open when trace 418 is at a higher level near the vertical axis arrow. The canister vent valve is fully closed when trace 418 is near the level of the horizontal axis. The horizontal axis represents time and time increases in the direction of the horizontal axis arrow. Trace 418 represents the state of the canister vent valve.

At time t0, the engine (not shown) is running (e.g., rotating and combusting fuel) and the FTIV is closed. The fuel tank vacuum level is above threshold 452 and the bypass valve for the first carbon filled canister is closed. The hydrocarbon load of the first carbon filled canister is low. The bypass valve for the second carbon filled canister is closed and the hydrocarbon load of the second carbon filled canister is at a medium level. The bypass valve for the third carbon filled canister is closed and the hydrocarbon load of the third carbon filled canister is at a lower medium level. The canister vent valve is also closed.

At time t1, the fuel tank vacuum level exceeds threshold 450. Therefore, the FTIV is opened, the canister vent valve is opened, and the bypass valve of the first carbon filled canister is opened. In addition, the bypass valves for the second and third carbon filled canisters are held closed. This allows vacuum in the fuel tank to draw in fuel vapors that are stored in the second and third carbon filled canisters. Air flows into the second and third carbon filled canisters via the canister vent valve (not shown). Opening the bypass valve of the first carbon filled canister may reduce restriction of the evaporative emissions system so that fuel vapors that are stored in the second and third carbon filled canisters may be drawn more quickly into the fuel tank.

At time t2, the vacuum in the fuel tank is reduced to less than threshold 452. Therefore, the FTIV, the canister vent valve, and the bypass valve for the first carbon filled canister are closed shortly thereafter. Closing the FTIV prevents fuel vapors from begin drawn into or from the fuel tank. The hydrocarbon load in the second and third carbon filled canisters is reduced to near zero.

In this way, an amount of vacuum in a fuel tank may be reduced quickly. At the same time, fuel vapors stored in the second and third carbon filled canisters may be drawn back into the fuel tank and air may flow into the second and third carbon filled canisters via the canister vent valve.

Referring now to FIG. 5, an example sequence for reducing a level of pressure in a fuel tank is shown. The sequence of FIG. 5 may be provided by the system of FIGS. 1-3 in cooperation with the method of FIG. 6. Vertical markers at times t10-t12 represent times of interest during the sequence. All of the plots occur at a same time.

The first plot from the top of FIG. 5 is a plot of an amount of positive pressure in a fuel tank versus time. The vertical axis represents the pressure and the pressure level increases in the direction of the vertical axis arrow. The horizontal axis represents time and time increases in the direction of the horizontal axis arrow. Trace 502 represents the level of pressure in the fuel tank.

The second plot from the top of FIG. 5 is a plot of the state of the fuel tank isolation valve (FTIV) versus time. The vertical axis represents the operating state of the FTIV and the FTIV is fully open when trace 504 is at a higher level near the vertical axis arrow. The FTIV is fully closed when trace 504 is near the level of the horizontal axis. Trace 504 represents the state of the FTIV. The horizontal axis represents time and time increases in the direction of the horizontal axis arrow.

The third plot from the top of FIG. 5 is a plot of the state of the bypass valve for the first carbon filled canister (e.g., the first bypass valve state) versus time. The vertical axis represents the operating state of the bypass valve for the first carbon filled canister (e.g., 304) and the bypass valve for the first carbon filled canister is fully open when trace 506 is at a higher level near the vertical axis arrow. The horizontal axis represents time and time increases in the direction of the horizontal axis arrow. The bypass valve for the first carbon filled canister is fully closed when trace 506 is near the level of the horizontal axis. Trace 506 represents the state of the bypass valve for the first carbon filled canister.

The fourth plot from the top of FIG. 5 is a plot of the hydrocarbon load (e.g., amount of hydrocarbons stored in the carbon filled canister) of the first carbon filled canister versus time. The vertical axis represents the hydrocarbon load of the first carbon filled canister and the hydrocarbon load increases in the direction of the vertical axis arrow. The horizontal axis represents time and time increases in the direction of the horizontal axis arrow. Trace 508 represents the load of the first carbon filled canister.

The fifth plot from the top of FIG. 5 is a plot of the state of the bypass valve for the second carbon filled canister (e.g., the second bypass valve state) versus time. The vertical axis represents the operating state of the bypass valve for the second carbon filled canister (e.g., 306) and the bypass valve for the second carbon filled canister is fully open when trace 510 is at a higher level near the vertical axis arrow. The bypass valve for the second carbon filled canister is fully closed when trace 510 is near the level of the horizontal axis. The horizontal axis represents time and time increases in the direction of the horizontal axis arrow. Trace 510 represents the state of the bypass valve for the second carbon filled canister.

The sixth plot from the top of FIG. 5 is a plot of the hydrocarbon load (e.g., amount of hydrocarbons stored in the carbon filled canister) of the second carbon filled canister versus time. The vertical axis represents the hydrocarbon load of the second carbon filled canister and the hydrocarbon load increases in the direction of the vertical axis arrow. The horizontal axis represents time and time increases in the direction of the horizontal axis arrow. Trace 512 represents the load of the second carbon filled canister.

The seventh plot from the top of FIG. 5 is a plot of the state of the bypass valve for the third carbon filled canister (e.g., the third bypass valve state) versus time. The vertical axis represents the operating state of the bypass valve for the third carbon filled canister (e.g., 308) and the bypass valve for the third carbon filled canister is fully open when trace 514 is at a higher level near the vertical axis arrow. The bypass valve for the third carbon filled canister is fully closed when trace 514 is near the level of the horizontal axis. The horizontal axis represents time and time increases in the direction of the horizontal axis arrow. Trace 514 represents the state of the bypass valve for the third carbon filled canister.

The eighth plot from the top of FIG. 5 is a plot of the hydrocarbon load (e.g., amount of hydrocarbons stored in the carbon filled canister) of the third carbon filled canister versus time. The vertical axis represents the hydrocarbon load of the third carbon filled canister and the hydrocarbon load increases in the direction of the vertical axis arrow. The horizontal axis represents time and time increases in the direction of the horizontal axis arrow. Trace 516 represents the load of the third carbon filled canister.

The ninth plot from the top of FIG. 5 is a plot of the state of the canister vent valve 310 versus time. The vertical axis represents the operating state of the canister vent valve and the canister vent valve is fully open when trace 518 is at a higher level near the vertical axis arrow. The canister vent valve is fully closed when trace 518 is near the level of the horizontal axis. The horizontal axis represents time and time increases in the direction of the horizontal axis arrow. Trace 518 represents the state of the canister vent valve.

The tenth plot from the top of FIG. 5 is a plot of the state of the canister purge valve 302 versus time. The vertical axis represents the operating state of the canister purge valve and the canister purge valve is fully open when trace 520 is at a higher level near the vertical axis arrow. The canister purge valve is fully closed when trace 520 is near the level of the horizontal axis. The horizontal axis represents time and time increases in the direction of the horizontal axis arrow. Trace 520 represents the state of the canister purge valve.

At time t10, the engine (not shown) is running (e.g., rotating and combusting fuel) and the FTIV is closed. The fuel tank pressure level is above threshold 552 and the bypass valve for the first carbon filled canister is closed. The hydrocarbon load of the first carbon filled canister is medium. The bypass valve for the second carbon filled canister is closed and the hydrocarbon load of the second carbon filled canister is at a lower medium level. The bypass valve for the third carbon filled canister is closed and the hydrocarbon load of the third carbon filled canister is at a lower level. The canister vent valve is also closed and the canister purge valve is closed.

At time t11, the fuel tank pressure exceeds threshold 550. Therefore, the FTIV is opened, the canister vent valve is opened, the canister purge valve is opened, the bypass valve of the first carbon filled canister is opened, the bypass valve of the second carbon filled canister is opened, and the bypass valve of the third carbon filled canister is opened. This allows the engine to take in gaseous hydrocarbons from the fuel tank that are mixed with air that is drawn in via the venturi pump through the first, second, and third bypass passages. By mixing the hydrocarbons with air before inducting the hydrocarbons into the engine, it may be possible to avoid combustion stability issues that may be due to a rich air-fuel mixture. The hydrocarbon load in the first carbon filled canister is reduced along with the fuel tank pressure. The hydrocarbon loads in the second and third carbon filled canisters is unchanged.

At time t12, the pressure in the fuel tank is reduced to less than threshold 552. As a result, the FTIV, the canister vent valve, canister purge valve, and the bypass valves are closed shortly thereafter. Closing the FTIV and canister purge valve prevents fuel vapors from begin drawn into the engine. The hydrocarbon load in the second and third carbon filled canisters remains unchanged.

In this way, an amount of pressure in a fuel tank may be reduced quickly. At the same time, air may be mixed with fuel vapors that are drawn from the fuel tank so as to improve combustion stability. In particular, it may be possible to avoid richer engine air-fuel ratios because gaseous vapors entering the engine may be diluted.

Figure 6:
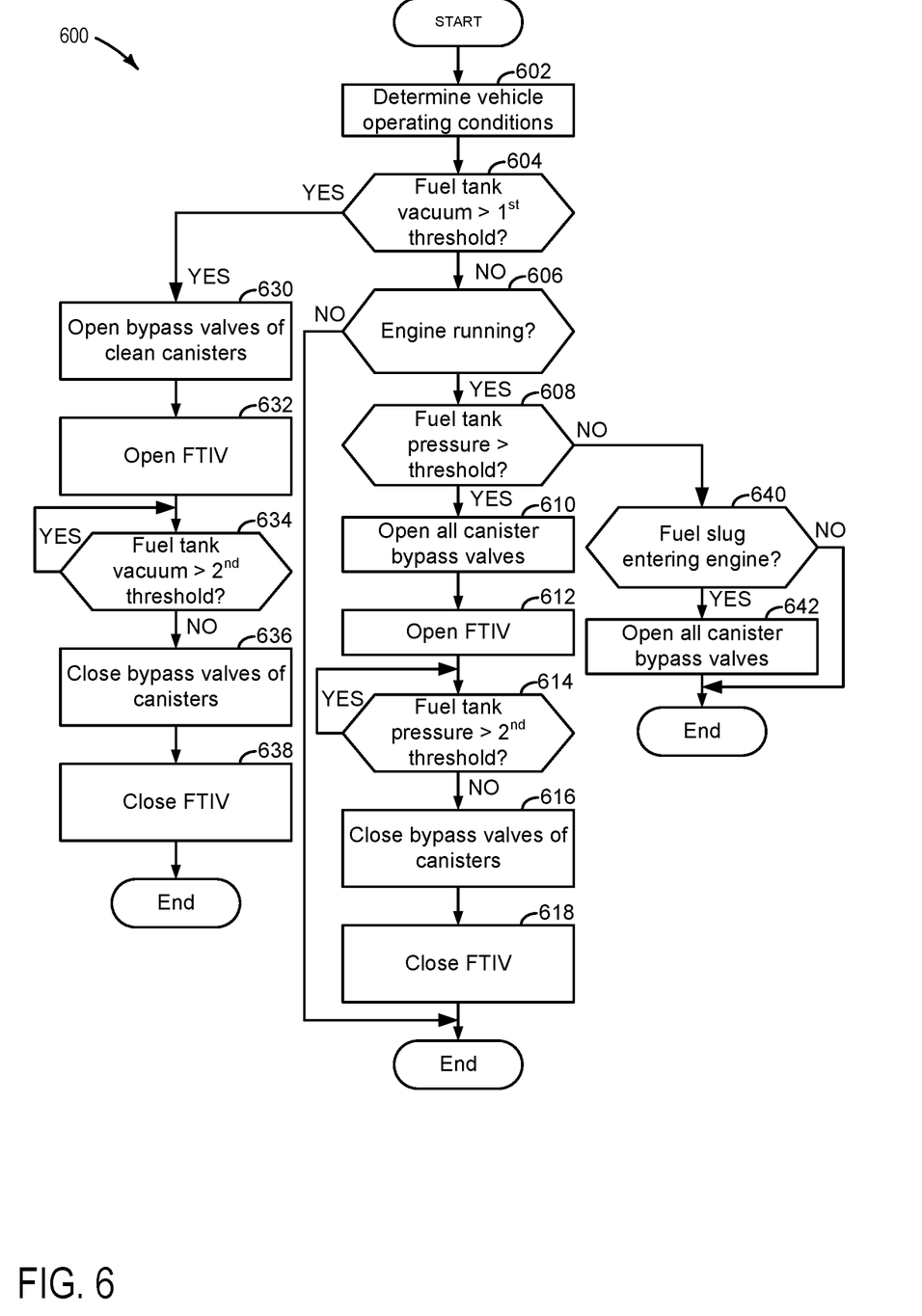
FIG. 6 shows an example method for operating an evaporative emissions system for a vehicle.

Referring now to FIG. 6, an example method 600 for operating an evaporative emission system is shown. In particular, the method may premix air and gaseous fuel as well as control pressure in a fuel tank. At least portions of method 600 may be included in and cooperate with a system as shown in FIGS. 1-3 as executable instructions stored in non-transitory memory. The method of FIG. 6 may cause the controller to adjust the actuators in the real world and receive data and signals from sensors described herein when the method is realized via executable instructions stored in controller memory.

At 602, method 600 determines vehicle operating conditions. Vehicle operating conditions may include but are not limited to ambient air temperature, engine speed, engine air flow amount, driver demand torque or power, intake manifold pressure, spark timing, barometric pressure, intake inlet pressure, fuel tank pressure, carbon filled canister hydrocarbon loads, and engine air-fuel ratio. Method 600 may determine or infer these conditions from the various sensors mentioned herein. Method 600 proceeds to 604.

At 604, method 600 judges if there is a vacuum in the fuel tank that is greater than a threshold vacuum level. If so, the answer is yes and method 600 proceeds to 630. Otherwise, the answer is no and method 600 proceeds to 606.

At 630, method 600 opens bypass passage valves of carbon filled canisters that have less than a threshold amount of hydrocarbons stored therein. For example, if the second carbon filled canister has less than 5% of its hydrocarbon storage capacity presently being used to store hydrocarbons and the first and third carbon filled canisters are utilizing 85% of their respective capacities to store hydrocarbons, where the threshold is 10% of the respective carbon filled canisters hydrocarbon storage capacity, then method 600 opens the bypass valve for the second carbon filled canister and closes or leaves closed the bypass valves for the first and third carbon filled canisters. In another example, if the first and second carbon filled canisters have less than 5% of their hydrocarbon storage capacity presently being used to store hydrocarbons and the third carbon filled canister is utilizing 75% of its respective capacity to store hydrocarbons, where the threshold is 10% of the respective carbon filled canisters hydrocarbon storage capacity, then method 600 opens the bypass valves for the first and second carbon filled canisters and closes or leaves closed the bypass valves for the third carbon filled canister. Method 600 may determine loading of the one or more carbon filled canisters via hydrocarbon sensors or via an oxygen sensor of the engine when fuel vapors are flowing to the engine. Method 600 proceeds to 632.

At 632, method 600 opens the FTIV. In addition, method 600 may open the CVV. By opening the FTIV and the CVV, air may flow into the fuel tank from atmosphere via the CVV, bypass valves, and FTIV. Air flowing into the fuel tank reduces the vacuum in the fuel tank and opening the bypass valves of clean carbon filled canisters may allow air to flow into the fuel tank at a higher rate since the bypass passages may restrict air flow less than the carbon filled canisters. Carbon filled canisters that do not have their bypass valves open may be back purged such that fuel vapors in carbon filled canisters that do not have their bypass valves open may be returned to the fuel tank by the vacuum in the fuel tank drawing vapors from the carbon filled canisters that are not bypassed. For example, if all carbon filled canisters have loading that is less than a threshold level, all bypass valves are turned on and air flows from the CVV to the fuel tank. If the second carbon filled canister is storing more than a threshold amount of fuel vapor and the first and third carbon filled canisters are storing less than the threshold amount of fuel vapor, the bypass valve for the second carbon filled canister may be opened while the bypass valves for the first and third carbon filled canisters are held closed. Method 600 proceeds to 634.

At 634, method 600 judges if a vacuum level in the fuel tank is greater than a second threshold, where the second threshold is less than the first vacuum threshold. If so, the answer is yes and method 600 returns to 634. Otherwise, the answer is no and method 600 proceeds to 636.

At 636, method 600 closes the bypass valves of the carbon filled canisters that are open. Method 600 proceeds to 638.

At 638, method 600 closes the FTIV. Additionally, method 600 may close the CVV. The FTIV may be closed to stop flow of hydrocarbons out of the fuel tank or to prevent air flow into the fuel tank. Method 600 proceeds to exit.

At 606, method 600 judges if the vehicle's engine is running (e.g., rotating and combusting fuel). In one example, method 600 may judge that the engine is running if engine speed is greater than a threshold speed and fuel is being injected to the engine. If method 600 judges that the vehicle's engine is running, the answer is yes and method 600 proceeds to 608. Otherwise, the answer is no and method 600 proceeds to exit.

At 608, method 600 judges if there is a positive pressure in the fuel tank that is greater than a threshold pressure level. If so, the answer is yes and method 600 proceeds to 610. Otherwise, the answer is no and method 600 proceeds to 640.

At 640, method 600 judges if a fuel slug (e.g., an amount of fuel that aids in the enrichening the engine's air-fuel ratio to a value that is lower than may be desired, lower than 12:1 for example) is being delivered to the engine via the evaporative emissions system. Method 600 may judge that a fuel slug is being delivered via the vehicle's evaporative emissions system when the CPV is open and engine air-fuel ratio is richer than a threshold amount. Alternatively, method 600 may judge that a fuel slug is being delivered via the vehicle's evaporative emission system when the CPV is open and a temperature of one or more carbon filled canisters is changing. A fuel slug may be delivered to the engine when the CPV and FTIV are open. In addition, a fuel slug may be delivered one or more of the carbon filled canisters is being purged of hydrocarbons. The CPV may be open when a fuel slug is delivered to the engine via the evaporative emissions system. If method 600 judges that a fuel slug is being delivered to the engine, method 600 proceeds to 642. Otherwise, method 600 proceeds to exit.

At 642, method 600 opens one or more of the bypass valves of the carbon filled canisters. For example, if the fuel slug is due to purging fuel vapors from the fuel tank, all bypass valves of carbon filled canisters may be opened. Additionally, method 600 may open the CVV. Opening the bypass valves of the carbon filled canisters and the CVV may allow air to mix with fuel vapors that are being drawn from the fuel tank into the engine so that purging of fuel vapor from the fuel tank may continue. Method 600 may close all of the open bypass valves of the carbon filled canisters when the fuel slug ceases. Method 600 proceeds to exit.

At 610, method 600 opens all (e.g., the first, second, and third bypass valves of the carbon filled canisters) the bypass valves of the carbon filled canisters. By opening all of the bypass valves, air may mix with fuel within the venturi fuel pump 330. The air may be drawn into the venturi fuel pump 330 via the low pressure port 330*a*. Mixing of the air and fuel vapors may allow the FTIV to open at a faster rate such that the fuel tank may be depressurized in a shorter amount of time without causing engine combustion stability issues. Method 600 proceeds to 612.

At 612, method 600 opens the FTIV if the FTIV is not already open. Opening the FTIV may activate the venturi pump 330 by providing a motive force fluid to the venturi pump 330. Method 600 proceeds to 614.

At 614, method 600 judges if a pressure of the fuel tank is greater than a second pressure, the second pressure may be less than the first pressure. If so, method 600 returns to 614. If not, method 600 proceeds to 616.

At 616, method 600 closes the bypass valves of the carbon filled canisters. Method 600 proceeds to 618. Closing the bypass valves prevents air from being delivered to the engine via the evaporative emissions system.

At 618, method 600 closes the FTIV. Closing the FTIV ceases flow of fuel vapors from the fuel tank to the engine. Method 600 proceeds to exit.

In this way, fuel vapors may be purged from an evaporative emissions system. In addition, air may be mixed with fuel vapors in the evaporative emissions system so as to reduce a possibility of combustion instability. Air may be mixed with fuel vapors via a venturi pump so that an air-fuel ratio of the engine does not become richer than may be desired.

Thus, the method of FIG. 6 provides for a method for operating an evaporative emissions system of a vehicle, comprising: reducing pressure in a fuel tank via opening a fuel tank isolation valve and opening a bypass valve of a first carbon filled canister. The method further comprises opening a bypass valve of a second carbon filled canister to reduce pressure in the fuel tank. The method further comprises opening a bypass valve of a third carbon filled canister to reduce pressure in the fuel tank. The method includes where the pressure in the fuel tank is reduced in response to the pressure in the fuel tank exceeding a threshold pressure. The method further comprises closing the fuel tank isolation valve and the bypass valve of the first carbon filled canister in response to pressure in the fuel tank being less than a threshold pressure. The method further comprises reducing the pressure in the fuel tank via opening a canister purge valve. The method further comprises flowing air and fuel vapors through a venturi pump. The method further comprises flowing the air and fuel vapors through a first carbon filled canister, the bypass valve of the first carbon filled canister configured to bypass the first carbon filled canister.

In another example, the method of FIG. 6 provides for a method for operating an evaporative emissions system of a vehicle, comprising: mixing air with fuel vapors flowing directly from a fuel tank via a venturi pump during purging of fuel vapors from the fuel tank, where the fuel vapors flow directly from the fuel tank without passing through a carbon filled canister. The method includes where the mixing of air is in response to detecting a fuel slug is being delivered to an engine. The method further comprises opening all bypass valves of the carbon filled canisters via a controller so that air may be delivered to the venturi pump. The method further comprises opening a canister vent valve via the controller so that air may be delivered to the venturi pump. The method includes where the venturi pump draws in the air and mixes the air with fuel vapors from the fuel tank.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine;
at least two fuel vapor storage canisters fluidically coupled in series;
a first conduit coupling a canister purge valve to a first of the at least two fuel vapor storage canisters;
a first bypass passage coupling a vent port of a first of the at least two fuel vapor storage canisters to a low pressure port of a venturi pump; and
a second conduit coupling a first motive fluid port of the venturi pump and a load port of the first of the at least two fuel vapor storage canisters.

2. The vehicle system of claim 1, further comprising a second bypass passage for a second of the at least two fuel vapor storage canisters and a third bypass passage for a third of the at least two fuel vapor storage canisters.

3. The vehicle system of claim 2, further comprising a first bypass valve positioned along the first bypass passage, a second bypass valve positioned along the second bypass passage, and a third bypass valve positioned along the third bypass passage.

4. The vehicle system of claim 3, further comprising a canister vent valve coupled to the third of the at least two fuel vapor storage canisters via a third conduit.

5. The vehicle system of claim 4, further comprising a fuel tank isolation valve coupled to a second motive fluid port of the venturi pump via a fourth conduit.

6. The vehicle system of claim 5, further comprising a fifth conduit coupling the fuel tank isolation valve and a fill limit vent valve.

7. The vehicle system of claim 6, further comprising a canister purge valve and a controller including executable instructions stored in non-transitory memory that cause the controller to open the canister purge valve and the fuel tank isolation valve to activate the venturi pump.

8. A method for operating an evaporative emissions system of a vehicle, comprising:
reducing pressure in a fuel tank via opening a fuel tank isolation valve and opening a bypass valve of a first carbon filled canister;
flowing air and fuel vapors through a venturi pump; and
flowing the air and fuel vapors through a first carbon filled canister, the bypass valve of the first carbon filled canister configured to bypass the first carbon filled canister.

9. The method of claim 8, further comprising opening a bypass valve of a second carbon filled canister to reduce pressure in the fuel tank.

10. The method of claim 9, further comprising opening a bypass valve of a third carbon filled canister to reduce pressure in the fuel tank.

11. The method of claim 10, where the pressure in the fuel tank is reduced in response to the pressure in the fuel tank exceeding a threshold pressure.

12. The method of claim 8, further comprising closing the fuel tank isolation valve and the bypass valve of the first carbon filled canister in response to pressure in the fuel tank being less than a threshold pressure.

13. The method of claim 8, further comprising reducing the pressure in the fuel tank via opening a canister purge valve.

14. A method for operating an evaporative emissions system of a vehicle, comprising:
mixing air with fuel vapors flowing directly from a fuel tank via a venturi pump during purging of fuel vapors from the fuel tank.

15. The method of claim 14, where the mixing of air is in response to detecting a fuel slug is being delivered to an engine, and where the fuel vapors flow from the fuel tank without passing through a carbon filled canister.

16. The method of claim 14, further comprising opening all bypass valves of the carbon filled canisters via a controller so that air may be delivered to the venturi pump.

17. The method of claim 16, further comprising opening a canister vent valve via the controller so that air may be delivered to the venturi pump.

18. The method of claim 17, where the venturi pump draws in the air and mixes the air with fuel vapors from the fuel tank.

* * * * *